United States Patent Office 2,891,509
Patented June 23, 1959

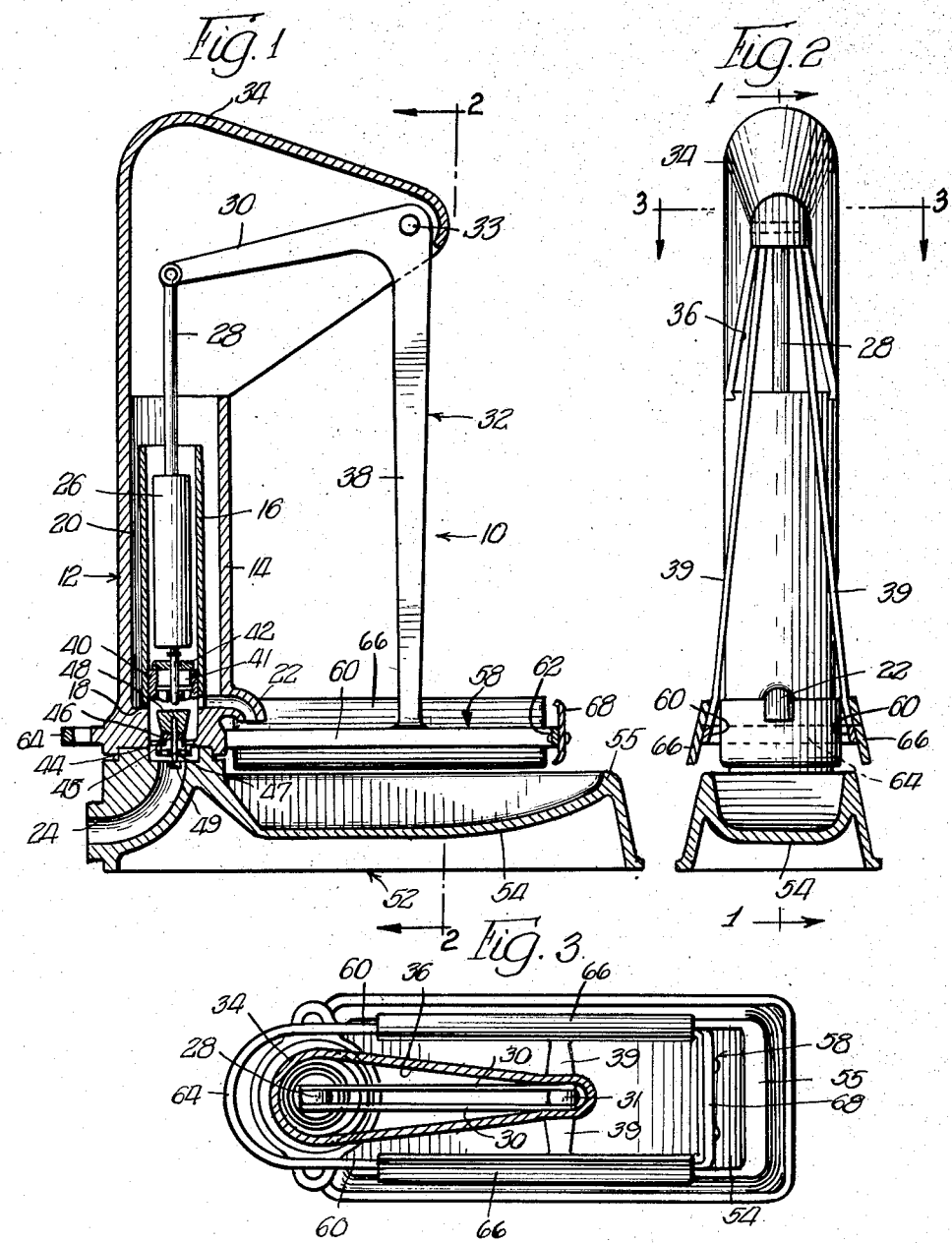

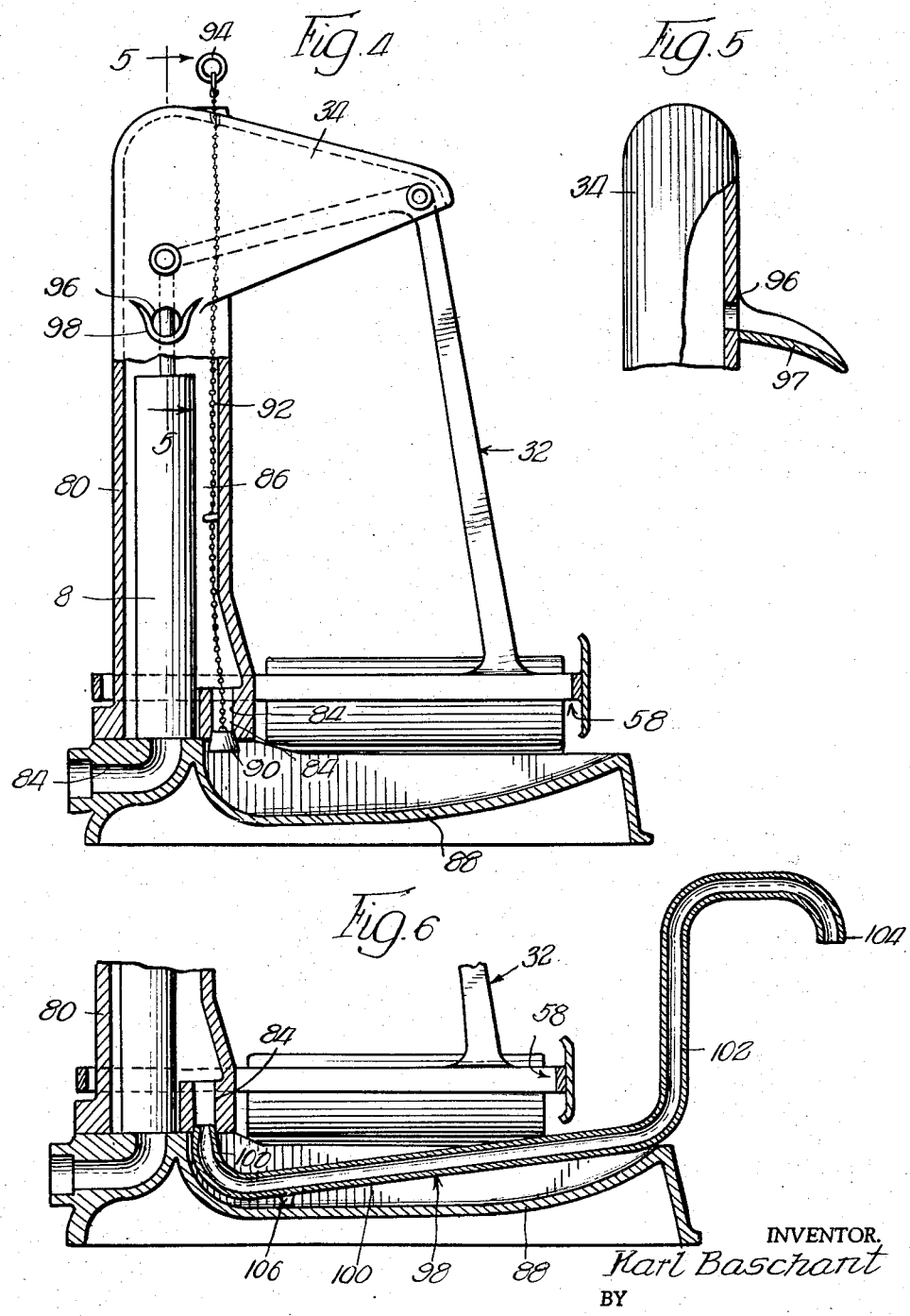

2,891,509

WATERING DEVICE FOR STOCK

Karl Baschant, Lubeck, Germany, assignor to Utina-Electrowerk G.m.b.H., Eutin, Germany, a corporation of Germany Application January 2, 1959, Serial No. 784,778

9 Claims. (Cl. 119—75)

The present invention relates to a watering device for stock and in particular to new and useful improvements therefor, and is a continuation in part of my application Serial No. 444,570, filed July 20, 1954, and expressly abandoned on February 9, 1959.

Numerous devices have been proposed in the prior art for automatically watering stock. One type of device that is particularly prevalent embodies a depressible gate which is actuated by the weight of the animal. This gate is mounted in association with a watering trough or the like so that as the stock approaches the trough, the gate is depressed. The gate in turn is connected to a pump which supplies water to the trough. While these devices have been somewhat successful, they do have certain disadvantages which seriously limit their use. For example, these devices by their nature, in order to withstand the repeated trampling of the stock, must be of a relatively heavy construction. For this reason these devices are relatively expensive and require a considerable amount of space. A still further disadvantage of this type of construction is the fact that the gate when in its depressed condition is normally in contact with the ground or surface upon which the watering trough is mounted. It is characteristic of such watering places that the ground immediately surrounding the watering trough is usually muddy due to spillage from the trough and covered with debris as a result of the stock. As a result, the gate and other associated actuated mechanism soon becomes encrusted with dirt and the like. This material in many instances will interfere with the operation of the gate and the actuating mechanism so that it must be cleaned or otherwise replaced.

Another type of automatic watering device which has been proposed previously utilizes the movements of the head of the animal. However, these types have the disadvantage that they require an unnatural movement of the animal's head. Consequently the pumps fail to supply the water as desired and are generally unsatifactory.

For these reasons among others I have invented a new and useful automatic watering device for stock. In this particular device the water is supplied into a trough having an inclined surface of which the lower end of the surface is away from the animal. The trough is shielded in such a way that the animal must approach it from the upper end. As the water recedes in the trough, the animal will insert its head farther and farther in order to gain access to the remaining water. When this happens, the animal's head will actuate the unique arrangement of lever elements which in turn are connected to a suitable pumping mechanism.

One object of the invention resides in the provision of an automatic watering device for stock, which is actuated by natural movements of the animal.

A still further object of the invention resides in the provision of a stock watering device of a new and novel construction.

A still further object of the invention resides in the provision of a stock watering device of a simple and economical construction that may be easily installed without any special skills or instructions.

These and other objects of the invention will be apparent upon reading of the specification with reference to the following drawings.

In the drawings:

Figure 1 is a front view partially in section taken along the line 1—1 in Figure 2 of the watering device embodying the invention.

Figure 2 is an end view in section taken along the lines 2—2 in Figure 1.

Figure 3 is a plan view in section taken along the lines 3—3 in Figure 1.

Figure 4 is a front view partially in section of a modification of the device embodying the invention.

Figure 5 is a fragmentary view partially in section taken along the lines 5—5 in Figure 4.

Figure 6 is a fragmentary view in section of the lower portion of the modification shown in Figure 4 with water outlet added.

Referring now to Figure 1, there is shown one form of the watering device embodying the invention generally denoted by the numeral 10. The watering device includes a pump 12 which may be any suitable construction. One particular form that has been found to be especially suitable for this use is a double-acting plunger type pump. This type pump consists of a cylindrical body 14 in which is arranged an upright pump cylinder 16 having its lower end in sealing engagement with the annular shoulder 18. The cylinder 16 is spaced from the body 14 resulting in a space 20 which communicates with the discharge nozzle 22. In its preferred form the pump cylinder 16 is eccentrically disposed within the body 14, so as to provide a crescent shaped space 20 between the two bodies.

One advantage of the eccentric arrangement is that the pump body 14 may be of a slightly smaller size since the crescent chamber merely has to catch the water discharged at the upper end of the pump cylinder 16 and guide it to a discharge nozzle 22 as will be explained more fully later on. However, it should be pointed out that the pump cylinder 16 may be conventionally disposed within the pump body 14 so as to provide an annular space therebetween.

The pump cylinder 16 communicates by means of the passage 24 with a suitable source of water. A displacement cylinder 26 is mounted within the pump cylinder 16 and is connected by means of the plunger rod 28 to a bifurcated arm 30 of the pump lever generally denoted by the numeral 32 which is pivotally mounted on the pin 33. The lever 32 is rotatably mounted within a hood 34 which is secured to the pump body 14 as shown in Figure 1.

The hood in its preferred form consists of a casting, preferably produced integrally with the pump body 14. As shown in the drawings, the hood 34 is of such shape that it shields substantially all of the pumping mechanism and the lever arm 30 so as to prevent the entry of foreign material, debris and the like which would tend to interfere with the operation of the pump. The hood 34 is provided with a slot 36 through which extends the bifurcated arm 38 composed of the members 39 as best shown in Figure 2. The slot 36 permits the arm 38 to move about the pivot point 33 on which the pump lever 32 is mounted. It will also be noticed in Figure 2 that the hood 34 in its preferred form is of such shape as to permit a relatively large angle of rotation of arm 30.

As best shown in Figure 2, the opening 36 is of a tapered construction with the narrower end being spaced from the pump body 14. This arrangement further prevents dirt from getting into the pump cylinder and the stock from causing damage to the pump.

One form of a suitable pump mechanism is shown in Figure 1. The pump mechanism includes a plunger 40 which is slidably received within the cylinder 16 and includes a disk of compressible material such as rubber, leather, or the like. The plunger 40 is provided with an axial passage 41 which is opened and closed by means of a flapper valve 42. When the plunger is moved upwardly, the valve 42 is held in seating engagement by the water within the cylinder 16 so that there is no movement of the water through the passage 41. Conversely, when the plunger 40 is moved downwardly, the valve 42 is forced open by the pressure of the water within the lower part of the cylinder 16.

A check valve 44 is mounted at the lower end of the cylinder 16 and is adapted to seat upon the shoulder 45. The valve 44 includes a depressible disk 46 constructed of some suitable material mounted upon the spindle 47. A weight 48 is mounted upon the spindle 47 so as to bias the disk 46 toward the seated position. The lower end of the spindle 47 is provided with a lug 49 which is adapted to abut the shoulder 45 when the valve is in its uppermost position.

As the plunger 40 is moved upwardly, the valve 44 is raised from its seat 45 so as to permit ingress of the water from the passage 24. This results in the filling of the cylinder 16. When the plunger 40 is forced downwardly, the valve 44 is held in the seated position so as to prevent escape of the water from the cylinder 16. The resultant increase in pressure causes the valve 42 to be lifted from its seated position so that the water flows through the passage 41. As the plunger 40 is moved further downwardly, the displacement cylinder 26 will cause a substantial portion of the water to overflow the cylinder 16 into the space 20. The remaining water within the cylinder 16 will be displaced when the plunger 40 is again moved upwardly to its raised position.

The pump body 14 in one preferred form is connected by means of the lateral flanges 15 to a cast iron supporting base generally denoted by the numeral 52. The supporting base 52 includes the passageway 24 which as previously mentioned is adapted to be connected to a source of water to be supplied to the pump 12. It is contemplated that the pump 12 and the base 52 may be constructed in any conventional manner so as to form an integral unit. It may be desirable to provide some type of protective coating such as enamel or the like over the exposed surfaces of the base 52 so as to prevent corrosion and rust and to facilitate the cleaning of dirt and the like from the base. The base 52 includes a basin 54 which is adapted to receive the discharge from the nozzle on the pump body 14. As best shown in Figure 1, the lower surface of the basin 54 is slightly inclined so as to provide a container of increasing depth when moving toward the pump with the shallow end of the basin 54 being at the forward end of the base 52 and the deepest end immediately under the nozzle. The length of the watering basin depends upon the desired length of motion of arm 38 of the pump levers 32. It can now be seen that as the water is consumed from the basin 54, it will tend to recede according to the contour of the bottom of the basin. As the result of this arrangement the water line will become spaced from the forward end of the basin 54, as the water is consumed.

The elements 39 are spread at their lower ends, as best shown in Figures 2 and 3, so as to be somewhat wider than the pump body 14 as best shown in Figure 3. The lower ends of the members 39 are connected to a bail member 58. The bail member 58 in one preferred form includes the laterally spaced substantially parallel legs 60 which embrace the pump body 14 and are secured together at one end by the cross member 62 and at the other end by the cross member 64. This arrangement permits the bail member 58 to be reciprocated with respect to the body 14 so as to permit movement of the pump lever 32 about its pivot point. It will also be noted that the lower ends of the elements 39 are sufficiently spaced to pass beyond the body 14 to permit the bail 58 to be moved rearwardly until the cross member 62 abuts the body 14.

A pair of deflector members 66 are secured to the legs 60 in any suitable fashion. This arrangement provides a guard assembly which prevents access by the stock to the water within the basin 54 from above. As a result, this arrangement makes it necessary for the stock to push the bail 58 toward the pump body 14 in order to gain access to the water within the basin 54.

It may be desirable to include end guard assembly, a bumper plate 68 or nose-engaging portion mounted on the cross member 62 as shown in Figure 1, so as to facilitate the reciprocation of the bail 58 as the animal inserts its head within the basin 54. This arrangement of the bail with respect to the pump lever 32 is such that the latter will always return to the position shown in Figure 1 due to its center of gravity. As the result of this arrangement, it is necessary that each time the basin 54 is used, the bail 58 must be forced toward the pump body 14 in the manner previously described. By returning to the position shown in Figure 1, the bail 58 also forces the pump plunger into the uppermost position so as to facilitate the pumping of the water into the basin 54 upon its next use.

A brief description of the watering device embodying the invention will now be set forth. In its preferred form the watering device is generally mounted on a base plate or some suitable foundation supported by the ground. Preferably the base plae is of such a height that the stock are enabled to drink out of the basin in a natural position. Next a quantity of water is pumped into the watering basin by manual operation of the pump lever 32. After the basin 54 has once been filled, it will continue to be refilled by the stock as will be seen hereinafter. After the watering device has been installed in this manner, it is then ready to use in the manner that will now be described. In order for an animal to have access to the water within the basin 54, it is necessary for the bail 58 to be pushed aside or toward the pump body 14. This is accomplished by the insertion of the animal's head into the gap between the bumper plate 68 and the forward end 55 of the basin 54. As the water is consumed, the level gradually recedes on the inclined bottom of the basin 54. As the animal attempts to follow the receding level, it is necessary to further displace the bail 58 towards the pump body 14. The displacement of the bail 58 causes the pump lever to lift the plunger with the result that the water in the cylinder is forced to flow over the upper edge into the crescent shaped chamber. The water within this chamber is discharged into the basin by means of the nozzle as previously described. When the animal has consumed all of the water within the basin 54, the bail 58 will be at its extreme displaced position. As soon as all of the water has been consumed, the animal will withdraw its head by natural instinct from the basin, whereupon the bail 58 will return to its normal position. As is mentioned previously, this will cause the pump to return to its uppermost position, as shown in Figure 1. When this happens, the pump plunger displaces a corresponding amount of water accumulated within the pump cylinder into the crescent shaped chamber and in turn into the basin 54 by means of the nozzle. In this way there is substantially a continuous flow of water during the movement of the pump lever 32 and the bail 58. This is the result of the unique arrangement of the pump lever and the bail 58 in combination with the basin 54 having an inclined bottom as described previously.

It should be pointed out that while the pump 12 is secured to the basin 54 so as to form an integral unit, it may be possible to mount the two sub-assemblies separately. In this case it would be necessary to revise the shape of the pump lever 32 in a conventional fashion to fit the specific application. It is apparent that the watering device may be provided with any suitable length of conduit for connecting it to a suitable source of water. In fact, many times it is desirable to arrange the watering device at a considerable distance from the source so as to prevent trampling of the ground surrounding the source. A long conduit also has the advantage of permitting the water to reach ambient temperature prior to reaching the watering device. In a preferred form the watering device embodying the invention can be so constructed that the quantity of water discharged into the basin during the upward movement of the plunger is substantially equal to the discharge during the downward movement of the plunger. This is best accomplished by designing the displacing body in such a way that its volume is equal to approximately one-half the volume of the pump cylinder. As a result of this arrangement, a substantially continuous flow of water into the basin can be obtained. It should be kept in mind that the supply of water into the watering basin does not primarily depend upon the length of movement of the pump lever 32. Thus, it is not necessary for the bail to be fully displaced by the animal in order to discharge water into the basin.

Referring now to Figures 4–6, there is shown a modified form of the watering device embodying the invention. This modification includes a pump body 80 in which is mounted a pump of some suitable type such as that described previously and generally denoted by the numeral 82. The pump body 80 is provided with a substantially vertical passage 84 which communicates with the crescent chamber 86 formed between the pump 82 and the pump body 80. The passage 84 normally permits the flow of water from the chamber 86 into the basin 88. A stop member 90 is adapted to be brought into sealing engagement with the lower end of the passageway 84 so as to permit the flow of water from the chamber 86. The manipulation of the stop member 90 between sealing and unsealing positions is facilitated by the chain 92 which extends upwardly through the pump body 80 and through the hood 34. The upper end of the chain 92 is provided with the ring 94 to permit the end from dropping into the pump body 80. As a result of this arrangement, it is possible to move the stop member 90 into sealing engagement without the necessity of displacing the bail member 58 and the lever 32. The pump body 80 is provided with an aperture 96 a suitable height from its base. A spout member 97 is secured to the pump body immediately under the aperture 96 and extends outwardly therefrom. The spout 97 directs the flow of water from the aperture in a well known manner. As a result of this arrangement, when the stop member 90 is brought into engagement with the passageway 84, the water is caused to accumulate within the pump body 80. The pump may be actuated by displacing the lever 32 and the bail 58 by any suitable means such as by the foot of the operator, causing the water to accumulate within the pump body until it flows out the aperture 96. In this manner it is possible for the user to obtain water for purposes other than the watering of stock. After sufficient water has been supplied by the pump, the tension on the chain 92 is then released so that the stop member 90 becomes disengaged from the passageway 84. The watering device is then returned to its normal operating construction for the watering of stock.

While one preferred form of the stop member 90 and means for its actuation have been disclosed, it is to be understood that other means may be used where expedient. In Figure 6 there is shown another modification for facilitating the use of the watering device for purposes other than the watering of stock. This arrangement includes a pipe member 98, such as that shown in the drawing. One end 100 of the pipe member 98 is adapted to be received within the passageway 84 of the pump body 80. When the end 100 is inserted in this manner, the water will be discharged into the pipe 98. The pipe 98 includes a vertical section 102 which is provided with a nozzle portion 104 to facilitate the discharge of the water into a bucket or container. The pipe 98 is further provided with a relatively long inclined portion 106 which is adapted to be at least partially disposed within the basin 88 as shown in Figure 6. The portion 106 is provided with a support 108 which is adapted to rest upon the bottom of the basin. The support 108 acts as a fulcrum so that the weight of the pipe to the right of the fulcrum will force the end 100 into engagement with the passageway 84. This arrangement provides a substantially water-tight engagement between the end 100 and the passageway 84 after the pipe 98 has once been placed into position. The actuation of the pump may be by any suitable manual means. As a result of this arrangement, it is possible to use the watering device for purposes other than that of watering stock. Once these purposes have been satisfied, the pipe may then be removed by disengaging the end 100 from the passageway 84. The watering device is then ready for use by stock for which it is primarily intended.

It can now be seen that the watering device embodying the invention provides means for automatically supplying water to stock in an efficient and economical manner. The watering device is easily installed and of such construction that it will withstand the abuse normally imparted by the stock.

A still further advantage of this invention is the fact that the watering device may be readily transported whenever it is necessary to move the location at which the stock are to be watered.

Although certain specific embodiments of the invention have been disclosed in the specification, it is to be understood that this is merely by way of example and in no manner to be construed as a limitation. It is contemplated that certain modifications may be made within the scope of the claims without departing from the spirit of the invention.

I claim:
1. A watering device for stock comprising a base member including an upright body portion, and a basin portion extending outwardly from said upright portion with the bottom of said basin adjacent said upright portion being deeper than at the outermost portion thereof so that as the water in said basin is consumed by an animal the water line thereof recedes away from said outermost portion toward said upright body portion, water discharge means on said upright portion communicating with said basin, pivot means supported by said base member and disposed above said basin portion, a depending lever pivoted on said pivot means and pendent therefrom, a substantially horizontally movable guard member including a nose-engaging portion connected to the lower end of said lever for movement therewith, said guard member mounted in obstructing relation to said basin so as to prevent access thereto when said lever is in its normal position, and pump means connected to said lever for actuation thereby and communicating with said water discharge means whereby an animal must actuate said pump means for access to the water in said basin portion.

2. A device as defined in claim 1, wherein there is provided at the lower end of said lever, means for substantially covering that portion of the basin rearwardly of said nose-engaging portion.

3. A device as defined in claim 2, wherein said nose-engaging portion extends in the direction vertical to the plane of said covering means.

4. A device as claimed in claim 1, wherein said pump means comprises a pump, a pump casing, and a space between said pump and said pump casing and wherein said water discharge means communicates with said space.

5. A device as claimed in claim 1, wherein an elevated second water discharge means is provided and wherein means are provided for closing the first water discharge means from said basin.

6. A device as claimed in claim 1, including a hood means for enclosing said fixed pivot means and the upper portion of said depending lever, said hood means accommodating the movement of said depending lever.

7. A watering device as defined in claim 1 wherein said pump means is a double-acting pump whereby water will be discharged on the forward and reverse strokes of same depending lever.

8. A watering device as defined in claim 1, wherein said lever is movable through an oscillatory path, said path being sufficiently short to enable multiple strokes solely by the head movement of an animal while standing in one place.

9. A watering device for stock comprising a base member including an upright body portion, and a basin portion extending outwardly from said upright portion with the bottom of said basin adjacent said upright portion being deeper than at the outermost portion thereof so that as the water in said basin is consumed by an animal the water line thereof recedes away from said outermost portion toward said upright body portion, water discharge means on said upright body portion communicating with said basin, pivot means supported by said base member and disposed above said basin portion, a depending lever pivoted on said pivot means and pendent therefrom, a guard member including a nose-engaging portion connected to the lower end of said lever having a path of travel extending between said outermost portion and said upright body portion, said guard member mounted in obstructing relation to said basin so as to prevent access thereto when said lever is in its normal position, and pump means connected to said lever for actuation thereby and communicating with said water discharge means whereby an animal must actuate said pump means for access to the water in said basin portion.

References Cited in the file of this patent

UNITED STATES PATENTS

| | | |
|---|---|---|
| 146,323 | Delaney | Jan. 13, 1874 |
| 221,065 | Holland | Oct. 28, 1879 |
| 306,679 | Douglas | Oct. 14, 1884 |
| 805,617 | Anderson | Nov. 28, 1905 |
| 1,856,582 | Osse | May 3, 1932 |
| 2,092,562 | Scharf et al. | Sept. 7, 1937 |
| 2,585,547 | Harmon | Feb. 12, 1952 |

FOREIGN PATENTS

| | | |
|---|---|---|
| 471,668 | Italy | May 20, 1952 |